June 18, 1963 W. E. BAKER 3,094,239
PRESSURE DEVICE
Filed Nov. 18, 1960
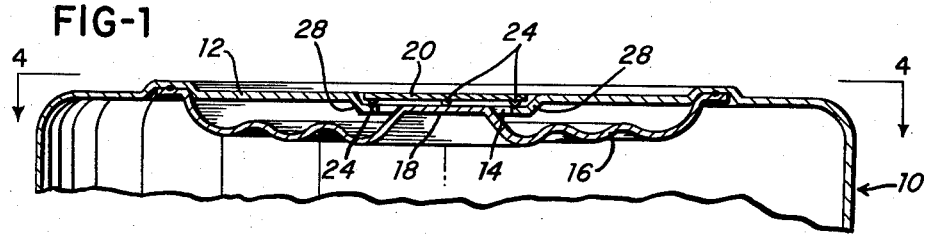
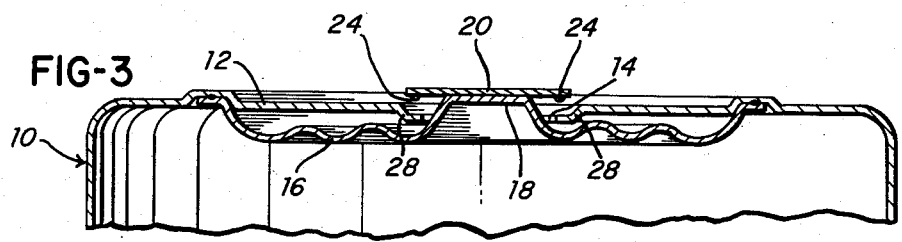
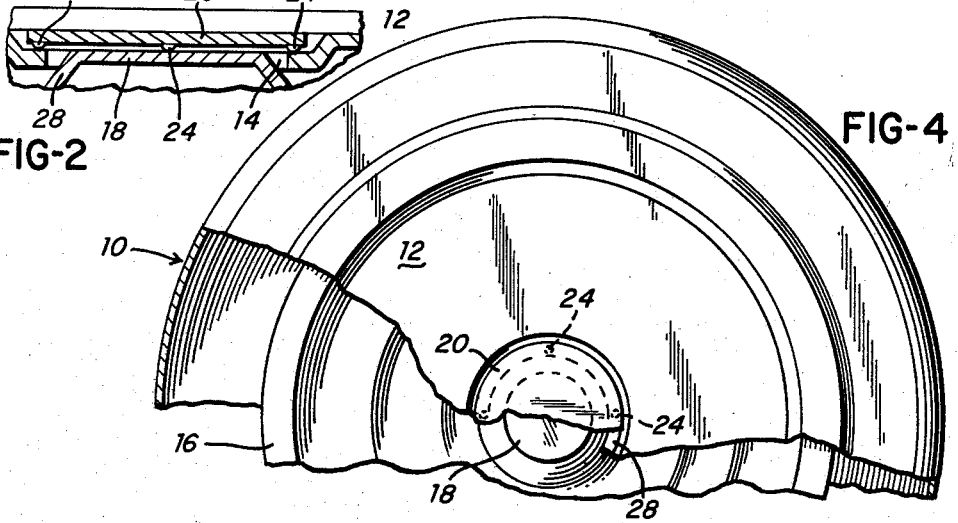
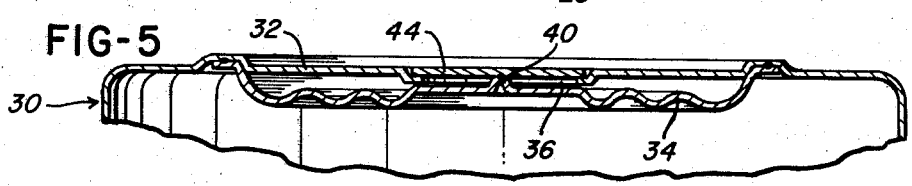
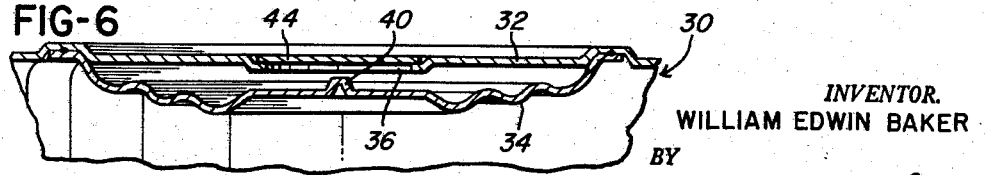
INVENTOR.
WILLIAM EDWIN BAKER
BY
ATTORNEY

3,094,239
PRESSURE DEVICE
William Edwin Baker, Needham, Mass., assignor to Standard-Thomson Corporation, Waltham, Mass., a corporation of Delaware
Filed Nov. 18, 1960, Ser. No. 70,236
14 Claims. (Cl. 220—44)

This invention relates to a pressure device. The invention relates more particularly to a device for indicating changes in pressure within a container. The invention relates still more particularly to means for indicating loss of positive pressure or loss of negative pressure within a container.

Many types of products and goods are packaged in containers which are sealed with negative pressure therein or with positive pressure therein. Of course, it is desired to maintain such a negative pressure or positive pressure within the container in order to protect the goods therewithin. However, various factors may cause the container to leak so that the desired positive or negative pressure therewithin is lost. Usually such leaks are caused by very small openings in the container and the change in pressure within the container caused thereby is unknown until the container is opened. At such time, the contents may be damage and in an unusable condition.

Therefore, an object of this invention is to provide low cost means by which such changes in pressure within a container may be easily and readily noted.

Other objects and advantages reside in the construction of parts, the combination thereof, the method of manufacture, and the mode of operation, as will become more apparent from the following description.

In the drawing:

FIGURE 1 is a fragmentary sectional view of a container provided with pressure indicator structure of this invention.

FIGURE 2 is an enlarged sectional view of a portion of the structure shown in FIGURE 1.

FIGURE 3 is a sectional view, similar to FIGURE 1, but showing the pressure indicator structure after a change in pressure within the container.

FIGURE 4 is a view taken substantially on line 4—4 of FIGURE 1 but with parts broken away.

FIGURE 5 is a fragmentary sectional view of a container showing a modification of pressure indicator structure of this invention.

FIGURE 6 is a sectional view, similar to FIGURE 5, but showing the pressure indicator structure after a change in pressure within the container.

Referring to the drawing in detail, FIGURE 1 shows a portion of a container 10 which has been sealed under negative pressure or vacuum. The container 10 is shown as including a rigid wall or bulkhead or retainer 12 which is provided with an opening 14 therethrough. A diaphragm or flexible inner enclosing wall 16 has the peripheral portion thereof sealingly attached to the inner surface of the bulkhead portion 12 of the container 10.

The diaphragm or flexible enclosing wall 16 has a central protuberant portion 18 which is movable through the opening 14 upon sufficient movement of the diaphragm 16 toward the bulkhead 12.

When the container 10 is sealed under vacuum or negative pressure, the diaphragm is forced inwardly by external pressure thereupon and is positioned as shown in FIGURE 1.

After the sealing of the container under negative pressure, the opening 14 of the bulkhead 12 is covered with a disc or any other suitable indicator element 20 having a plurality of small protuberances 24 on the lower surface thereof. The protuberances 24 are attached adhesively or by any other suitable means to the bulkhead 12 adjacent the opening 14, as best shown in FIGURE 2. The bulkhead 12 may have a depression 28 within which the opening 14 is formed. This depression 28 provides protection for the disc 20 against inadvertent disturbance thereof by objects which may come into contact with the container 10.

If a leak should occur in the container 10, the pressure within the container 10 becomes more nearly equal to that exterior thereof. Thus, pressure within the container 10 increases and the central portion of the diaphragm 16 moves to the position thereof shown in FIGURE 3. When this occurs, the engagement portion 18 of the diaphragm 16 moves through the opening 14 of the bulkhead 12 and applies a force upon the lower side of the disc 20. This force causes the attachment of the protuberances 24 to the bulkhead 12 to be severed, and the disc 20 is moved away from the bulkhead 12, as shown in FIGURE 3.

Such severance of the disc 20 from the bulkhead 12 may be easily and readily noted. In fact, the freely movable disc 20 may move a considerable distance from the opening 14 and the disc 20 may fall from the container 10.

When severance of the disc 20 from the bulkhead 12 occurs and is observed, steps immediately may be taken to open the container 10 to remove the contents thereof to prevent damage thereto.

FIGURES 5 and 6 show a container 30 which is adapted to be sealed under positive pressure. The container 30 has a wall portion or abutment portion 32 having a flexible wall or diaphragm 34 sealingly attached thereto on the inner surface thereof. The wall portion 32 has an opening 36 therethrough which leads to the diaphragm 34. The diaphragm 34 has a protuberance 40 in alignment with the opening 36.

The resiliency of the diaphragm 34 tends to cause the diaphragm 34 to assume the position thereof shown in FIGURE 6. However, when the container 30 is sealed under positive internal pressure, the central portion of the diaphragm 34 is forced to move toward the wall portion 32, as shown in FIGURE 5. In such position of the diaphragm 34, the protuberance 40 thereof is disposed within the opening 36. A disc or any other suitable indicator element 44 is attached adhesively or by any other suitable means to the protuberance 40, as shown in FIGURE 5. The disc 44 has edge portions engageable with the wall portion 32 adjacent the opening 36, but the disc or indicator element 44 does not prevent passage of air through the opening 36.

If, for any reason, the container 30 should leak, the pressure therewithin is reduced and the internal pressure may become equal to the external pressure. Upon sufficient reduction of pressure within the container 30, the diaphragm 34 resiliently moves to its normal position as shown in FIGURE 6. When this occurs, the protuberance 40 is drawn away from the disc 44, breaking the connection therebetween. Thus, the disc 44 is free to move with respect to the wall portion 32 and from the container 30.

The looseness of the disc 44 may be easily and readily detected. If the wall portion 32 is uppermost and horizontal, as shown in FIGURES 5 and 6, a person's finger engaging the disc 44 may be used to detect the freedom thereof. In any position of the wall 32, the disc 44 may move from the opening 36 and may fall from the container 30. After detachment of the disc 44 from the protuberance 40 is noted, steps may be immediately taken to remove the contents of the container 30 for protection thereof.

Thus, it is understood that the structure of this invention provides low cost means for easily and readily indicating change of pressure conditions within a container.

It is to be understood that any container, provided with indicator structure of this invention, may be disposed with the indicator structure uppermost, as shown in the drawings, or the indicator structure may be at a side portion or at a bottom portion of the container.

In order to avoid the possibility of contents within a container engaging the diaphragm or flexible wall, any suitable screen or apertured wall may be used within the container between the contents of the container and the diaphragm thereof.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination with a container, pressure change indicator means, the container having a rigid wall portion provided with an opening therethrough, a flexible wall member within the container and having a peripheral edge encompassing the opening and sealingly attached to the rigid wall portion, an indicator element disposed adjacent the opening, means severably attaching the indicator element to a portion of the flexible wall member so that upon movement of the portion of the flexible wall member away from the opening the attachment between the indicator element and said portion of the wall member is severed.

2. A pressure device comprising a container having a wall member provided with an opening therethrough, a diaphragm within the container and having edge portions encompassing said opening and secured to said wall member, a disc on the outer side of said wall and adjacent said opening, a portion of said diaphragm being attached to said disc.

3. A pressure device comprising a wall member having an opening therethrough, a diaphragm on one side of the wall member and attached thereto, a disc on the opposite side of the wall member and adjacent the opening, a portion of the diaphragm being adjacent the opening, the disc being severably attached to said portion of the diaphragm.

4. In a container, a flexible enclosing wall, an indicator element severably attached to a portion of the flexible enclosing wall, and engagement means adjacent the indicator element and engageable thereby to force severance of the indicator element from the flexible enclosing wall upon movement of said portion of the flexible wall with respect to said engagement means.

5. In a pressure device, a wall member provided with an opening therethrough, a diaphragm sealingly attached to the wall member on one side thereof and forming a chamber between the wall member and the diaphragm, the opening leading to the chamber, the diaphragm having a protuberance extending into the opening, a disc disposed on the opposite side of the wall member from the diaphragm and adhesively attached to the protuberance of the diaphragm.

6. Apparatus of the type described comprising a container including a flexible enclosing wall, retainer means carried by the container adjacent the flexible enclosing wall, an indicator member severably attached to the retainer means and engageable by a portion of the flexible enclosing wall upon sufficient movement thereof, the indicator member being detachable from the retainer member by such engagement by the flexible enclosing wall.

7. Apparatus of the type described comprising a container including a flexible enclosing wall member having a movable portion, a retainer member carried by the container adjacent the flexible enclosing wall member, indicator means removably attached to one of said said members, the indicator means being engageable by the movable portion of the flexible enclosing wall means, the indicator means being detachable from the member to which it is attached by movement of the movable portion of the flexible enclosing wall member.

8. In combination with a container, pressure change indicator means, the container having a rigid wall portion provided with an opening therethrough, a flexible wall member within the container and having a peripheral edge encompassing the opening and sealingly attached to the rigid wall portion, an indicator element disposed adjacent the opening, means severably attaching the indicator element to a portion of the container, the flexible wall member having an engagement portion movable through the opening and engageable with the indicator element so that upon movement of the engagement portion of the flexible wall member through the opening the attachment between the indicator element and said portion of the container is severed.

9. A pressure device comprising a container having a wall member provided with an opening therethrough, a diaphragm within the container and having edge portions encompassing said opening and secured to said wall member, a disc on the outer side of said wall and adjacent said opening, the disc being removably attached to said wall, the diaphragm having a movable portion which is movable through said opening and engageable with the disc for movement thereof.

10. In a container, a flexible enclosing wall, support means carried by the container, an indicator element severably attached to a portion of the support means, the flexible wall being movable with changes in pressure applied thereto, the flexible wall having an engagement portion which is engageable with the indicator element to sever the indicator element from said support means to indicate changes in pressure applied to the flexible wall.

11. In combination with a container provided with a rigid wall member having an inner side and an outer side, the rigid wall member being provided with an opening therethrough, a flexible wall member on the inner side of the rigid wall member and having a movable portion encompassing the opening, an indicator member disposed on the outer side of the rigid wall member and engageable therewith adjacent the opening, the indicator member being severably attached to one of the wall members and engageable with the other of said members for severance of the indicator member from the member to which it is severably attached.

12. Apparatus of the type described comprising:

a container provided with a wall member having an opening therein, a flexible wall member within the container and sealingly attached thereto in closing relation to said opening, the flexible wall member having a portion movable toward and away from said opening, a rigid cover member covering said opening, the cover member being removably attached to one of said wall members and engageable with the other wall member for removal of the cover member from the wall member to which it is removably attached.

13. In a pressure device, a wall member having an inner side and an outer side and having an opening therethrough, a diaphragm member on the inner side of the wall member and sealingly attached to the wall member on the inner side thereof so that a chamber is formed between said members with the opening leading to the chamber, an indicator element on the outer side of said wall member and adjacent the opening, the indicator element being severably attached to one of said members, there being relative movement between the other of said members and the indicator element for engagement therebetween for severance of the indicator element from the member to which it is severably attached.

14. Apparatus of the type described comprising:
a container member having an opening therein,
a flexible wall member within the container member and sealingly attached thereto in closing relation to said opening, the flexible wall member having a portion movable toward and away from said opening, and a rigid disc covering the opening, the flexible wall member having an engagement portion which is movable into engagement with the rigid disc, the disc being severably attached to one of said members and detachable therefrom by movement of said engagement portion of the flexible wall member which causes engagement between the disc and the member to which it is not attached.

References Cited in the file of this patent
UNITED STATES PATENTS

| | | |
|---|---|---|
| 1,529,246 | Fenn | Mar. 10, 1925 |
| 2,027,430 | Hansen | Jan. 14, 1936 |
| 2,296,848 | Gueffroy | Sept. 29, 1942 |
| 2,326,771 | Eidson | Aug. 17, 1943 |